Patented Mar. 7, 1950

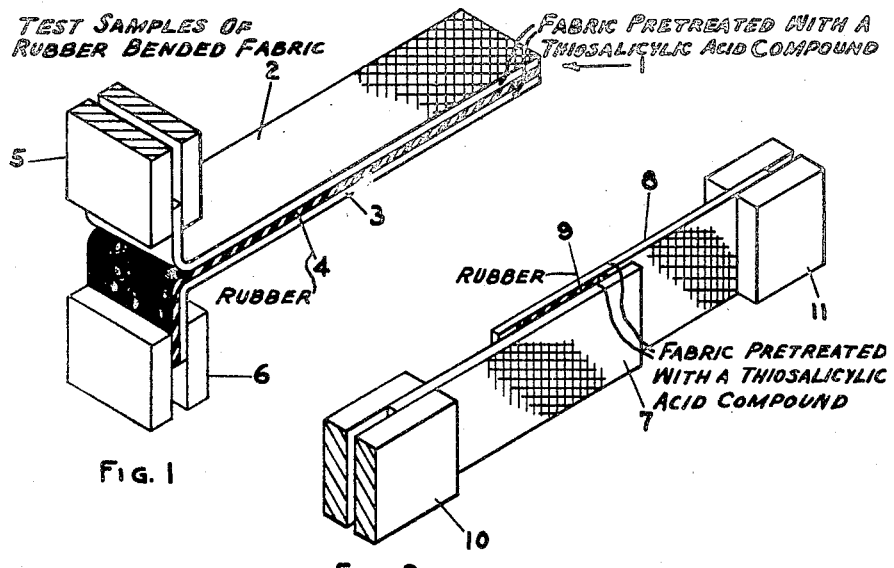
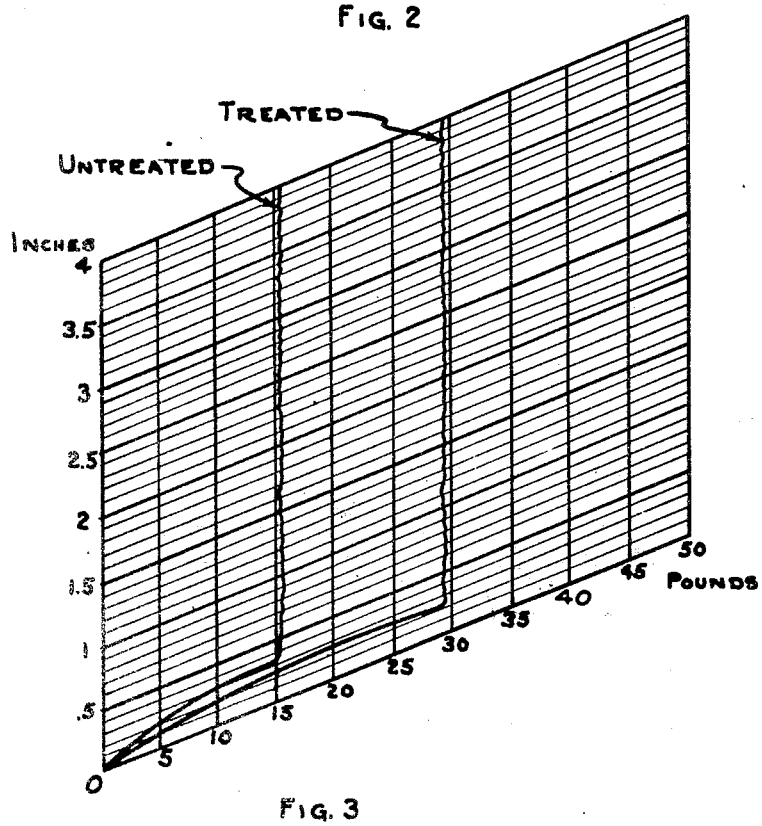

2,499,774

UNITED STATES PATENT OFFICE 2,499,774

ADHESION OF RUBBER TO FIBROUS MATERIALS

Fred S. Perkerson, La Grange, Ga., assignor, by mesne assignments, to Callaway Mills Company, La Grange, Ga., a corporation of Georgia Application December 21, 1945, Serial No. 636,413

6 Claims. (Cl. 154—139)

This invention relates to improvements in the bonding of rubber with fibrous materials and includes an improved method, and improved composite vulcanized products.

More particularly, the invention relates to improvements in the bonding of rubber compositions to cotton and rayon fabrics used in tire carcasses and tire manufacture where adhesion of the vulcanized rubber composition and the tire fabric is important and with resulting improvement in the resulting cotton-rubber or rayon-rubber bond and increased serviceability of the tires.

According to the present invention the fibrous materials, such as cotton or rayon fabrics used in tire construction, are pretreated with a non-volatile mercapto or sulfhydril compound, non-volatile at the vulcanization temperature, which contains a polar group in the molecule such as thiosalicylic acid and its derivatives, and vulcanizable rubber compositions are applied to the fibrous material and vulcanized. The compound may be applied to the fibrous material alone or as a solution or dispersion in a rubber cement.

The fibrous materials used according to the invention include various fibrous materials to which it is desirable to impart improved adhesion with rubber. The invention is of special advantage in connection with tire fabrics of cotton and rayon and including both cords and cord fabrics and woven fabrics of cotton and rayon, etc.

The invention includes the improved process in which improved adhesion of rubber to fibrous materials is obtained with the use of such non-volatile mercapto or sulfhydril compounds, the final vulcanized product.

The rubber compositions which are bonded to the fibrous material will vary with the character of products to be produced. Such rubber compositions are well known in the art and are illustrated, for example, by so-called squeegee stocks and tire carcass stocks in which the rubber is compounded with vulcanizing agents, accelerators, plasticizers, pigments, etc. with the particular formula varying somewhat with different tires and other products. The rubber compositions may be of natural rubber or of synthetic rubber such as buna rubbers, neoprene, and those "elastomers" which still contain ethylenic double bonds after completion of polymerization.

The treatment of the fibrous material with the non-volatile mercapto or sulfhydril compounds enables improved adhesion between the fibrous material and the rubber composition to be obtained. The impregnation of the fibrous material with such compounds gives an improved treated fabric which enables improved adhesion to be obtained between the fabric and the rubber composition subsequently applied thereto. The resulting composite product made with the treated fabric and with the application of vulcanizable rubber compositions followed by vulcanization is an improved product characterized by improved adhesion between the vulcanized rubber and the treated fabric.

The advantages of the invention are illustrated by a comparison of final vulcanized products made according to the present invention with vulcanized products similarly produced from untreated fibrous materials.

The improved products of the present invention show greatly increased bonding strength between the rubber and fibrous materials, e. g., when tested by the testing methods hereinafter referred to.

The invention will be further illustrated by the following examples:

*Example 1.*—Cotton duck and spun viscose rayon duck were separately treated by immersion in a 3% aqueous solution of sodium thiosalicylate and then acidified by immersion in dilute acetic acid. After drying a compounded vulcanizable rubber stock was applied thereto and the composite product cured under optimum conditions for the rubber stock used. To obtain comparative results the same fabric without treatment had the same compounded vulcanizable rubber stock applied thereto and similarly vulcanized. Tests carried out on the resulting products, by the test method hereinafter described, showed a materially greater adhesion in the case of the fabrics treated with the sodium thiosalicylate as compared with the untreated fabrics. Somewhat greater percentage increases both in overlap and tear bond strength were obtained in the case of the rayon duck than in the case of the cotton duck.

*Example 2.*—Cotton and rayon duck were separately immersed in a sulfur-free rubber cement containing about 6% rubber and 3% of thiosalicylic acid in a finely dispersed state and these fabrics were then allowed to air-dry. Vulcanizable rubber compositions were then applied to the treated fabrics and also to the same fabric in an untreated state and after vulcanization the products were tested for adhesion. A greatly increased tear bond strength was obtained with both the rayon and the cotton fabrics which had been treated with the rubber cement containing the thiosalicylic acid as compared with the fabrics treated with the rubber cement only; and a greater percentage increase in tear bond strength was obtained with the treated rayon duck than with the treated cotton duck.

*Example 3.*—Spun viscose rayon duck was immersed in a large volume of saturated solution of the sodium salt of diphenyl-disazo-bis-thiosalicylic acid,

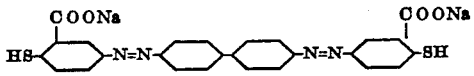

(the mercapto analogue of chrysamine G), and allowed to stand therein overnight. When dried and tested for adhesion to rubber by applying a vulcanizable rubber composition thereto and vulcanizing, the resulting fabric was found to have a greater overlap and tear bond strength than products which were made from fabric which was treated in the same way with water alone prior to the addition of the vulcanizable rubber compositions.

The accompanying drawing illustrates in a somewhat conventional and diagrammatic manner two methods of testing the products of the invention with an illustration of the improved results obtained, although the particular improvement obtained will vary somewhat and the figures given in the drawing for treated and untreated fabrics are intended merely to be illustrative.

In the accompanying drawings

Fig. 1 is a perspective view showing one test method;

Fig. 2 is a perspective view showing another test method; and

Fig. 3 shows a test chart obtained from a pendulum type recording testing machine.

In the test indicated in Fig. 1, a sample 1 is prepared and consists of two rectangular strips of fabric 2 and 3 with a strip of compounded rubber stock 4 therebetween. This sample is preferably cut to a width of one inch from a larger sample, the large sample having been previously cured under optimum conditions for the rubber stock used and maintained under constant pressure in a suitable press during the curing process.

One of the ends of the small sample 1 has the fabrics 2 and 3 sufficiently separated so that they can be placed in the jaws 5 and 6 of a testing machine. The testing machine is preferably so designed as to record the pull required to separate the pieces of fabric 2 and 3. A chart illustrative of the results of a treated and untreated sample of cotton duck is shown in Fig. 3. The test shown in Fig. 1 is referred to as the tear test.

Fig. 2 shows a second method of test. Two pieces of fabric 7 and 8 are overlapped with a narrow rubber strip 9 cured under pressure between the pieces of fabric 7 and 8 at the overlap. The free ends of the pieces 7 and 8 are placed in the jaws 10 and 11 of a testing machine and the amount of pull required to tear the strips 7 and 8 apart is measured. This test is referred to as the overlap test.

It will be understood that variations and modifications can be made in the invention and that the invention is not limited to the specific illustrative examples given.

I claim:

1. The method of improving the adhesion of rubber to fibrous textile materials which comprises applying to the said material a thiosalicylic acid compound containing a carboxyl group in ortho position to an SH group, applying a vulcanizable rubber compound to the treated fibrous material and vulcanizing the rubber compound.

2. The method of improving the adhesion of rubber to fibrous textile materials which comprises applying thiosalicylic acid to the said material, applying a vulcanizable rubber compound to the treated fibrous material and vulcanizing the rubber compound.

3. The method of improving the adhesion of rubber to fibrous textile material which comprises applying to the said material an adhesive cement, applying a vulcanizable rubber compound to the treated fibrous material and vulcanizing the rubber compound, said adhesive cement comprising rubber and a thiosalicyclic acid compound containing a carboxyl group in ortho position to an SH group.

4. The method of improving the adhesion of rubber to fibrous textile material which comprises applying to the said material an adhesive cement, applying a vulcanizable rubber compound to the treated fibrous material and vulcanizing the rubber compound, said adhesive cement comprising rubber and thiosalicylic acid.

5. A composite vulcanized rubber product including fibrous textile material bonded to vulcanized rubber, the fibrous material being pretreated before vulcanization with a thiosalicylic acid compound containing a carboxyl group in ortho position to an SH group, said vulcanized product being characterized by improved adhesion between the fibrous material and vulcanized rubber.

6. A composite vulcanized rubber product including fibrous textile material bonded to vulcanized rubber, the fibrous material being pretreated before vulcanization with thiosalicylic acid, said vulcanized product being characterized by improved adhesion between the fibrous material and vulcanized rubber.

FRED S. PERKERSON.

REFERENCES CITED

The following references are of record in the file of this patent:

UNITED STATES PATENTS

| Number | Name | Date |
| --- | --- | --- |
| 1,943,000 | Chandler | Jan. 9, 1934 |
| 2,005,637 | Schidrowitz | June 18, 1935 |
| 2,050,197 | Sebrell | Aug. 4, 1936 |
| 2,064,580 | Williams et al. | Dec. 15, 1936 |
| 2,137,686 | Habgood | Nov. 22, 1938 |
| 2,227,517 | Starkweather et al. | Jan. 7, 1941 |
| 2,234,215 | Youker | Mar. 11, 1941 |
| 2,263,305 | Lessig et al. | Nov. 18, 1941 |
| 2,346,440 | Lessig et al. | Apr. 11, 1944 |
| 2,415,839 | Neal et al. | Feb. 18, 1947 |

FOREIGN PATENTS

| Number | Country | Date |
| --- | --- | --- |
| 542,645 | Great Britain | June 21, 1942 |